(12) United States Patent
Baumgaertner et al.

(10) Patent No.: US 10,919,601 B2
(45) Date of Patent: Feb. 16, 2021

(54) CONTROL METHOD AND APPARATUSES FOR PUSH ASSISTANCE FOR AN ELECTRIC BICYCLE

(71) Applicant: Robert Bosch GmbH, Stuttgart (DE)

(72) Inventors: Daniel Baumgaertner, Tuebingen (DE); Rinaldo Greiner, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 15/709,526

(22) Filed: Sep. 20, 2017

(65) Prior Publication Data
US 2018/0086417 A1    Mar. 29, 2018

(30) Foreign Application Priority Data

Sep. 23, 2016 (DE) ........................ 10 2016 218 374

(51) Int. Cl.
| | |
|---|---|
| *B62M 6/50* | (2010.01) |
| *B62M 6/60* | (2010.01) |
| *B62M 6/90* | (2010.01) |
| *B62K 23/00* | (2006.01) |
| *B62K 11/00* | (2006.01) |
| *B60L 9/00* | (2019.01) |
| *G01P 15/00* | (2006.01) |

(Continued)

(52) U.S. Cl.
CPC ................ *B62M 6/50* (2013.01); *B62M 6/45* (2013.01); *B62M 6/55* (2013.01); *B60Y 2200/13* (2013.01); *B62J 45/414* (2020.02); *B62J 45/415* (2020.02); *B62K 11/00* (2013.01); *B62K 2204/00* (2013.01)

(58) Field of Classification Search
None
See application file for complete search history.

(56) References Cited

U.S. PATENT DOCUMENTS

| 6,247,548 B1 * | 6/2001 | Hayashi | H02K 11/048 |
|---|---|---|---|
| | | | 180/206.2 |
| 6,547,548 B1 * | 4/2003 | Irie | B29D 30/0601 |
| | | | 425/34.1 |

(Continued)

FOREIGN PATENT DOCUMENTS

| DE | 10 2016 209 570 B3 | 8/2017 |
|---|---|---|
| EP | 1 129 934 A2 | 9/2001 |
| EP | 2 829 464 A1 | 1/2015 |

*Primary Examiner* — Angela Y Ortiz
*Assistant Examiner* — Laura E Linhardt
(74) *Attorney, Agent, or Firm* — Maginot, Moore & Beck LLP (57) ABSTRACT

The present disclosure relates to a control method for regulating the electric motor of an electric bicycle for push assistance for the electric bicycle. The control method comprises identification of activation of the push assistance by the cyclist. When activation is identified, the electric motor generates a torque for driving the electric bicycle as push assistance. Subsequently, an acceleration by the electric bicycle in the direction of the longitudinal axis of the electric bicycle is captured by means of a first sensor, wherein the acceleration results on the basis of a manual pushing or braking force of the cyclist. The captured acceleration is compared with an acceleration threshold value in a further step, wherein, in the event of the acceleration threshold value being exceeded, the electric motor is regulated on the basis of a change in the captured acceleration to adapt the torque.

12 Claims, 4 Drawing Sheets

(51) Int. Cl.
    *B62M 6/45*    (2010.01)
    *B62M 6/55*    (2010.01)
    *B62J 45/414*    (2020.01)
    *B62J 45/415*    (2020.01)

(56) References Cited

U.S. PATENT DOCUMENTS

| | | | | |
|---|---|---|---|---|
| 6,957,129 | B2 * | 10/2005 | Hatanaka | B60L 50/51 |
| | | | | 701/1 |
| 2010/0131164 | A1 * | 5/2010 | Carter | F16H 15/52 |
| | | | | 701/61 |
| 2014/0081496 | A1 * | 3/2014 | Chun | B62M 6/45 |
| | | | | 701/22 |
| 2015/0019062 | A1 * | 1/2015 | Previdi | B60L 7/12 |
| | | | | 701/22 |
| 2015/0367750 | A1 * | 12/2015 | Takamoto | B62K 11/00 |
| | | | | 701/22 |
| 2016/0121963 | A1 * | 5/2016 | Tanaka | B60L 15/2009 |
| | | | | 701/22 |
| 2016/0318583 | A1 * | 11/2016 | Watarai | B62M 6/55 |
| 2017/0151999 | A1 * | 6/2017 | Kinpara | B62K 11/04 |
| 2017/0355420 | A1 * | 12/2017 | Tsuchizawa | B62M 6/45 |

* cited by examiner

CONTROL METHOD AND APPARATUSES FOR PUSH ASSISTANCE FOR AN ELECTRIC BICYCLE

This application claims priority under 35 U.S.C. § 119 to application no. DE 10 2016 218 374.5, filed on Sep. 23, 2016 in Germany, the disclosure of which is incorporated herein by reference in its entirety.

The present disclosure relates to a control method for regulating the electric motor of an electric bicycle and to a controller that is set up to perform the control method. The disclosure also relates to the electric bicycle with the controller.

BACKGROUND

The specification EP 2 829 464 A1 states that bicycles having an electric auxiliary drive can have push assistance. The push assistance allows motor driving up to a maximum velocity of e.g. 6 km/h. This allows the bicycle to be easily pushed up out of an underground garage, for example. To activate the push assistance, it is frequently necessary for a button to be held, which results in limited handability for the bicycle. Electric steering intervention is used in the specification EP 2 829 464 A1 to avoid undesirable movement during the push mode.

The specification DE 10 2016 209 570 A1, which is not a prior publication, describes a control method for regulating the electric motor for the push assistance of an electric bicycle. The control method ascertains the selected transmission ratio of the gears on the basis of a captured velocity. Regulation of the electric motor is effected on the basis of the ascertained transmission ratio. The velocity is captured using a sensor, for example using a Reed sensor. Alternatively, the sensor may be an acceleration sensor.

The specification DE 10 2016 209 560 A1, which is not a prior publication, describes a control method for regulating the electric motor for the push assistance of an electric bicycle. The control method regulates the electric motor on the basis of a captured pitch angle of the electric bicycle about the transverse axis thereof.

SUMMARY

The present disclosure relates to a control method for regulating the electric motor of an electric bicycle for push assistance for the electric bicycle. The control method comprises identification of activation of the push assistance by the cyclist. When activation is identified, the electric motor generates a torque for driving the electric bicycle as push assistance. Subsequently, an acceleration by the electric bicycle in the direction of the longitudinal axis of the electric bicycle is captured by means of a first sensor, wherein the acceleration results on the basis of a manual pushing or braking force of the cyclist. The captured acceleration is compared with an acceleration threshold value in a further step, wherein, in the event of the acceleration threshold value being exceeded, the electric motor is regulated on the basis of a change in the captured acceleration to adapt the torque.

When a cyclist with push assistance activated thus additionally pushes the electric bicycle using a manual pushing force in the longitudinal direction, in particular briefly by means of a manual force impulse, he accelerates the electric bicycle positively. This results, according to the disclosure, in an increased velocity in the push assistance of the electric bicycle. However, a maximum velocity for the push assistance of, by way of example, 6 km/h is not exceeded by the control method in this case. On the other hand, if the cyclist slows down the electric bicycle with push assistance activated using a manual force counter to the longitudinal direction of the electric bicycle, in particular briefly by means of a manual force impulse, then the electric bicycle experiences an acceleration counter to the longitudinal direction. Consequently, the control method reduces the torque of the electric motor and hence the velocity of the push assistance of the electric bicycle.

Pushing the electric bicycle, particularly controlling the velocity of the electric bicycle during push assistance, accordingly becomes very intuitive and convenient for the cyclist. In comparison with an adjustable velocity for the push assistance by means of a switch on the handlebars, for example, the velocity is adapted with the control method independently of a gripping position of the cyclist, i.e. the cyclist can grip the electric bicycle by the handlebars, by the saddle and/or by the luggage rack, for example.

In a preferred configuration, the velocity of the electric bicycle is ascertained in a further step. The ascertained velocity is furthermore compared with a velocity threshold value. In this configuration of the disclosure, the regulation of the electric motor is effected only if the ascertained velocity exceeds the velocity threshold value. As a result, the regulation according to the disclosure starts in a delayed manner and when the acceleration of the electric bicycle can be attributed to a manual pushing force of the cyclist in the direction of the longitudinal axis.

In a particularly preferred configuration of the disclosure, a sensor variable is additionally captured by means of a second sensor, wherein the captured sensor variable represents pitching of the electric bicycle about the transverse axis thereof. In particular, the sensor variable captured is a current rate of rotation, or a measure of the current pitch angle of the electric bicycle about the transverse axis thereof is ascertained. The sensor variable captured by means of the second sensor may alternatively be an acceleration in the direction of the vertical axis, i.e. the first sensor and the second sensor capture a two-dimensional acceleration that represents the pitching. In this configuration, the regulation of the electric motor is additionally effected on the basis of the sensor variable captured by means of the second sensor. By way of example, on a ride section that becomes increasingly steeper, the rate of rotation about the transverse axis of the electric bicycle is captured by means of the second sensor. The regulation is effected on the basis of the rate of rotation, for example only when the rate of rotation is zero. As a result, the control method remains intuitive and convenient on the slope of a ride section.

The disclosure also relates to the controller that is set up to perform the control method. The controller comprises a computation unit that identifies activation of the push assistance by the cyclist and takes the activation as a basis for generating a control signal for the electric motor. The computation unit furthermore captures the acceleration of the electric bicycle in the direction of the longitudinal axis. On the basis of the acceleration threshold value being exceeded, the generated control signal is subsequently adapted by the computation unit on the basis of the captured acceleration by the electric bicycle in the longitudinal direction. The regulation of the control signal for the electric motor is in this case effected preferably only in a delayed manner after the activation of the push assistance and/or additionally only after the velocity of the electric bicycle has exceeded a velocity threshold value.

Preferably, the computation unit furthermore captures a current sensor variable that represents the pitching of the electric bicycle. By way of example, the sensor variable is the pitch angle or the rate of rotation of the electric bicycle about the transverse axis thereof or the acceleration of the electric bicycle in the direction of the vertical axis. In this configuration, the computation unit adapts the control signal additionally on the basis of the captured sensor variable that represents the pitching of the electric bicycle.

The electric bicycle according to the disclosure comprises at least the electric motor, a first sensor for capturing an acceleration by the electric bicycle in the longitudinal direction, and the controller. The first sensor is preferably an acceleration sensor. Alternatively, the first sensor may also be a torque sensor that captures particularly the motor torque and indirectly the acceleration of the electric bicycle in the direction of the longitudinal axis of the electric bicycle. Optionally, the electric bicycle comprises a velocity sensor for capturing the velocity. In a preferred configuration, the electric bicycle furthermore has a second sensor for capturing a sensor variable that represents the pitching of the electric bicycle about the transverse axis thereof. The first sensor and the second sensor are preferably arranged in an inertial measuring unit on the electric bicycle.

BRIEF DESCRIPTION OF THE DRAWINGS

The present disclosure is explained below with reference to preferred embodiments and appended drawings.

DETAILED DESCRIPTION

Figure 1:
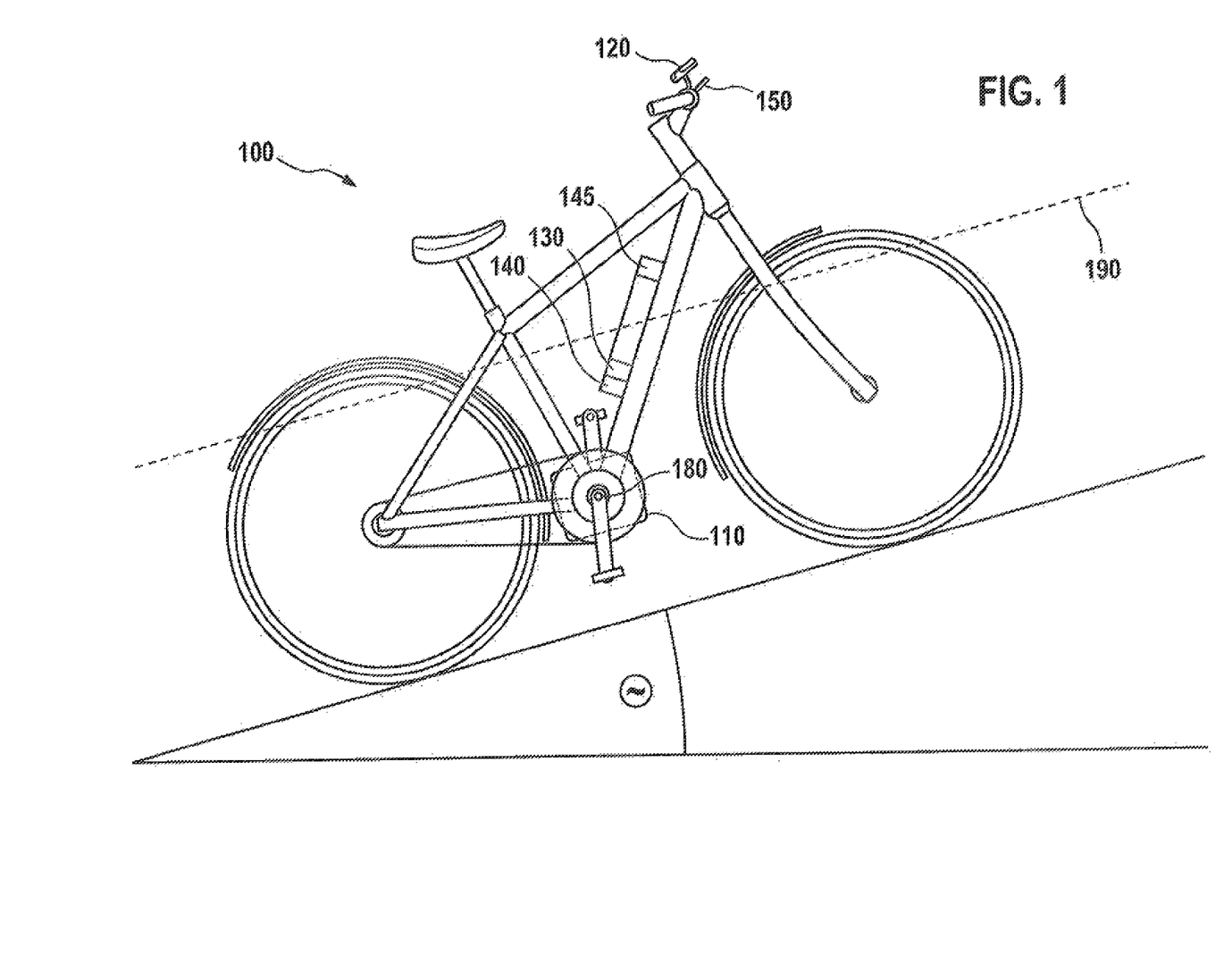
FIG. 1 shows an electric bicycle

FIG. 1 depicts an electric bicycle 100 according to the disclosure. The electric bicycle 100 comprises an electric motor 110, a first sensor 130 for capturing an acceleration a of the electric bicycle 100 in the longitudinal direction 190 and a controller 120 for regulating the electric motor 110. The electric bicycle 100 optionally has a second sensor 140, wherein the second sensor 140 is used to capture a sensor variable that represents pitching of the electric bicycle 100 about the transverse axis thereof. Preferably, the electric bicycle 100 has an inertial measuring unit that comprises the first sensor 130 and the second sensor 140. Furthermore, the electric bicycle 100 preferably has a switch 150 arranged on it, particularly on the handlebars, for the cyclist to activate the push assistance. In addition, a velocity sensor 145 may be arranged on the electric bicycle 100.

Preferably, the first sensor 130 is an acceleration sensor that captures the acceleration a of the electric bicycle 100 at least in the longitudinal direction 190 of the electric bicycle 100 and hence also a change in the acceleration a directly and very accurately. The first sensor 130 may alternatively be a torque sensor, wherein the torque sensor is arranged on an axle 180 of the electric motor 110 and captures the motor torque or drive torque of the electric motor 110. The torque sensor on the axle 180 of the electric motor 110 indirectly also captures the acceleration a through a manual force of the cyclist, because the force of the cyclist reduces or increases the drive torque on the axle 180 of the electric motor 110 in comparison with the previously generated torque M of the electric motor 110. In an alternative configuration of the disclosure, the first sensor 130 is a force sensor. The force sensor may be arranged on the handlebars or on the front part of the electric bicycle 100, for example. A manual pushing or braking force of the cyclist on the electric bicycle 100 in the longitudinal direction is captured by the force sensor, and the resultant acceleration a by the electric bicycle 100 is ascertained.

Figure 2:
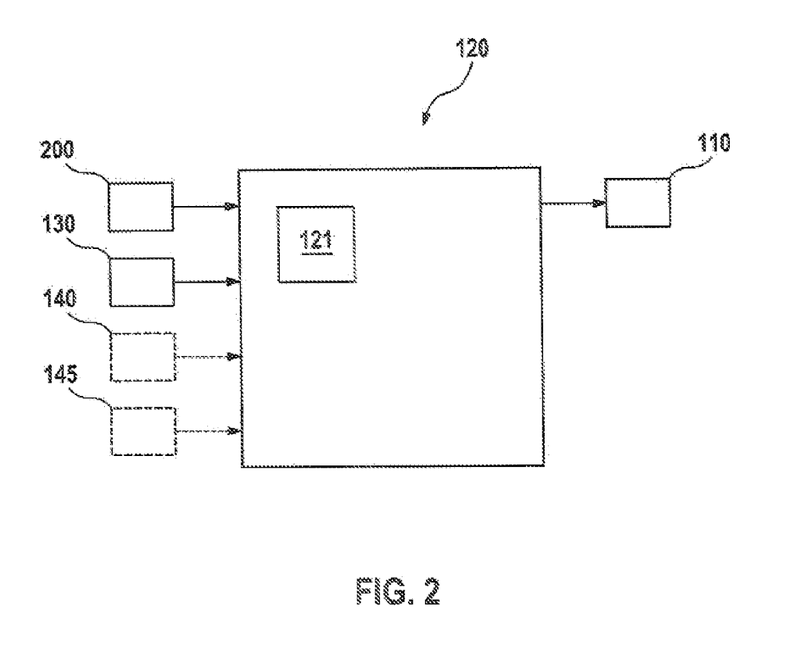
FIG. 2 shows a block diagram of a controller

FIG. 2 depicts the controller 120. The controller 120 comprises a computation unit 121. The computation unit 121 captures the activation of the push assistance by the cyclist 200 and the acceleration a of the electric bicycle 100 in the longitudinal direction from the first sensor 130. Optionally, the computation unit 121 captures a sensor variable from the second sensor 140 that represents the pitching of the electric bicycle 100 about the transverse axis thereof. The computation unit 121 can additionally capture the velocity v of the electric bicycle 100 from the velocity sensor 145. The computation unit 121 takes the activation of the push assistance as a basis for generating a control signal for the electric motor 110. The control signal is adapted by the computation unit 121 on the basis of the change in the captured acceleration a if the captured acceleration a exceeds an acceleration threshold value $SW_a$. The control signal can be adapted with a time delay after the activation of the push assistance, particularly after 1 s, 2 s, 4 s or 8 s or after a velocity threshold value $SW_v$ has been exceeded. Optionally, the control signal is adapted by the computation unit 121 additionally on the basis of the captured sensor variable that represents the pitching of the electric bicycle 100.

Figure 3:
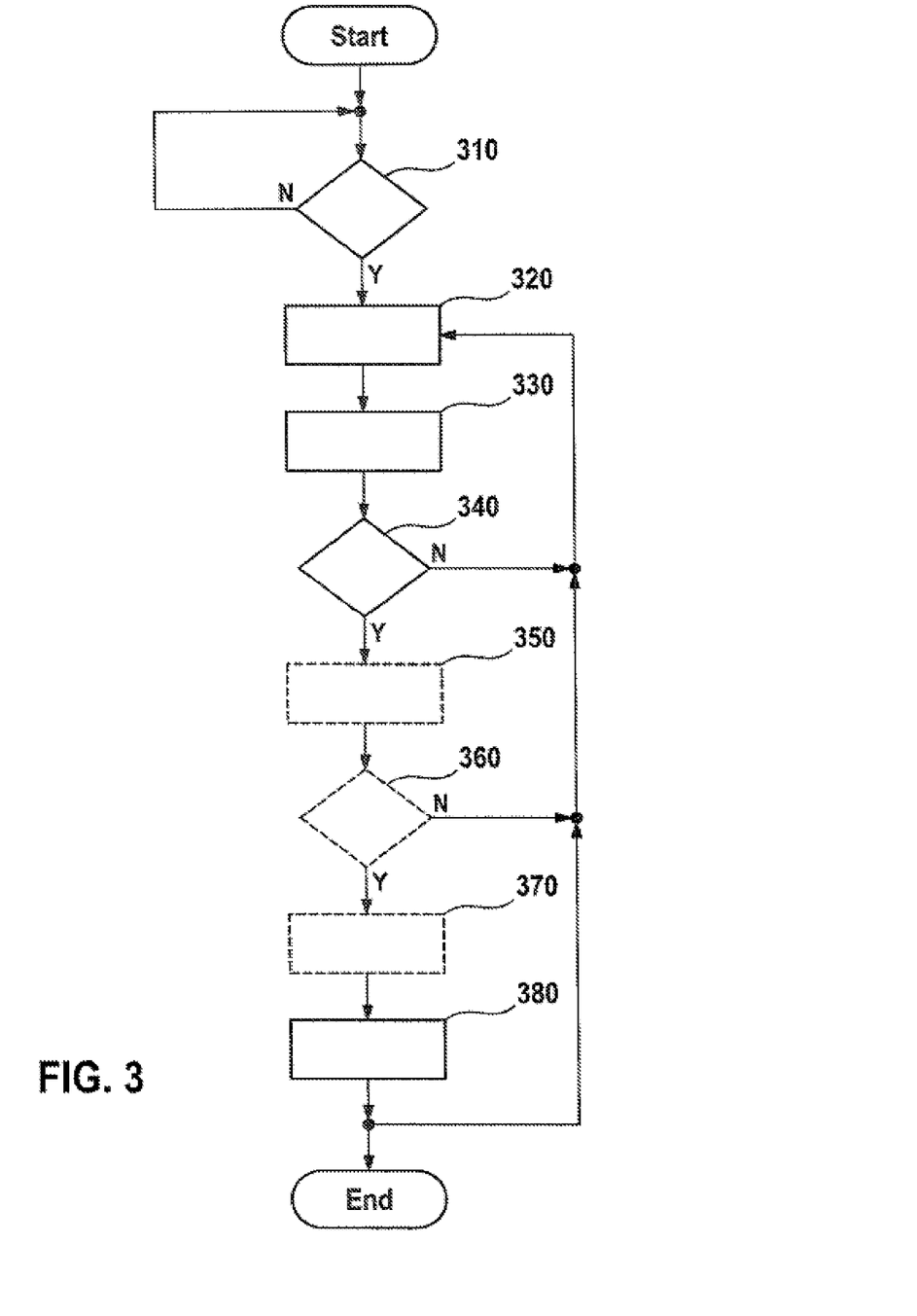
FIG. 3 shows a flowchart for a control method

FIG. 3 depicts a flowchart for the control method according to the disclosure for the push assistance of the electric bicycle 100. The control method comprises identification 310 of activation of the push assistance by the cyclist, for example the cyclist 200 pushes the switch 150 arranged on the handlebars in order to activate the push assistance. Alternatively, the activation 310 of the push assistance can be effected by virtue of an audible command from the cyclist 200 that is captured by a microphone arranged on the electric bicycle 100. When activation is not identified, the further steps of the control method are not performed. When the activation 310 is identified, a torque M for driving the electric bicycle 100 is generated by means of the electric motor 110 in step 320. Subsequently, in a further step 330, the first sensor 130 is used to capture the acceleration a of the electric bicycle 100 in the direction of the longitudinal axis 190. In a subsequent step 340, the captured acceleration a is compared with an acceleration threshold value $SW_a$. If the acceleration a of the electric bicycle 100 in the longitudinal direction 190 exceeds the acceleration threshold value $SW_a$, then the electric motor 110 is regulated in a subsequent step 380 on the basis of the change in the captured acceleration a. After the regulation 380, the control method can be executed once more, the control method then beginning with step 320.

The cyclist thus has to apply at least one force predetermined by the acceleration threshold value $SW_a$ to the electric bicycle 100, particularly a pushing force impulse or braking force impulse, in order for the regulation 380 to adapt the torque M of the electric motor 110.

In a further configuration of the disclosure, the acceleration threshold value is zero, so that the electric motor is regulated independently of the level of the acceleration.

In an alternative configuration, after the generation 320 of the torque M, the capture 330 of the acceleration a of the electric bicycle 100 in the direction of the longitudinal axis and/or the regulation 380 of the electric motor 110 are effected after a period of time has elapsed after the activation 310 of the push assistance, for example after 1 s, 2 s, 4 s or 8 s. The period of time is chosen particularly such that the regulation 380 of the electric motor 110 is effected only after the electric bicycle 100 has been accelerated to a first velocity $v_1$ by means of the generated torque M in step 320 and the first velocity remains constant for a short period of time.

In a further configuration, after the generation 320 of the torque M and before the regulation 380, the velocity v of the electric bicycle 100 is captured using the optional velocity sensor 145 in a step 350. In a subsequent step 360, the captured velocity v is compared with a velocity threshold value $SW_v$. If the velocity v exceeds the velocity threshold value $SW_v$, in this configuration the regulation 380 of the electric motor 110 is effected. If the velocity v does not exceed the velocity threshold value $SW_v$, the electric motor 110 continues, in line with the step 320, to generate a, for example constant, torque M. As a result, the regulation 380 of the electric motor 110 is performed only after a first velocity $v_1$ is reached or only after a manual pushing or braking force from the cyclist 200.

In an optional step 370 before regulation 380 of the electric motor, the second sensor 140 is used to capture a current sensor variable that represents the pitching of the electric bicycle 100. In this configuration, the regulation 380 of the electric motor 110 is effected additionally on the basis of the captured sensor variable.

By way of example, in step 370, the current rate of rotation Θ of the electric bicycle 100 about the transverse axis thereof is captured as a sensor variable. In this example, the regulation 380 of the electric motor 110 is effected only if the rate of rotation Θ about the transverse axis of the electric bicycle is zero or less than a threshold value $SW_Θ$, i.e. when the electric bicycle 100 is not pitching about the transverse axis thereof.

In an alternative example, an acceleration $a_z$ by the electric bicycle 100 in the direction of the vertical axis is captured in step 370 as a sensor variable by means of the second sensor 140. On the basis of the two-dimensional acceleration of the electric bicycle, i.e. the captured accelerations a in the direction of the longitudinal axis 190 and $a_z$ in the direction of the vertical axis, it is possible to ascertain the pitching or the rate of rotation Θ of the electric bicycle 100 about the transverse axis. In this example, the regulation 380 of the electric motor 110 is effected likewise only if the rate of rotation Θ about the transverse axis of the electric bicycle, as ascertained on the basis of the two-dimensional acceleration, is zero or less than a threshold value $SW_Θ$, i.e. when the electric bicycle 100 is not pitching about the transverse axis thereof.

In a further, alternative example, a pitch angle Θ is ascertained in step 370 on the basis of the capture of the sensor variable by means of the second sensor 140, and the acceleration of the electric bicycle 100 in the longitudinal direction 190 in a downhill direction on account of its own weight is ascertained on the basis of the pitch angle Θ. Subsequently, a difference arises between the current acceleration in the longitudinal direction as ascertained by means of the first sensor 130 and the ascertained acceleration of the electric bicycle on account of its own weight. In this example, the regulation 380 of the electric motor is effected on the basis of the ascertained acceleration difference, i.e. on the basis of the sensor variable that represents the pitching of the electric bicycle.

Preferably, the second sensor 140 is a rotation rate sensor that captures the rate of rotation Θ of the electric bicycle 100 about the transverse axis thereof. Alternatively, the second sensor is an acceleration sensor that captures the acceleration of the electric bicycle 100 in the direction of the vertical axis of the electric bicycle 100. The first sensor 130 and the second sensor 140 may be arranged together in an inertial measuring device.

Figure 4:
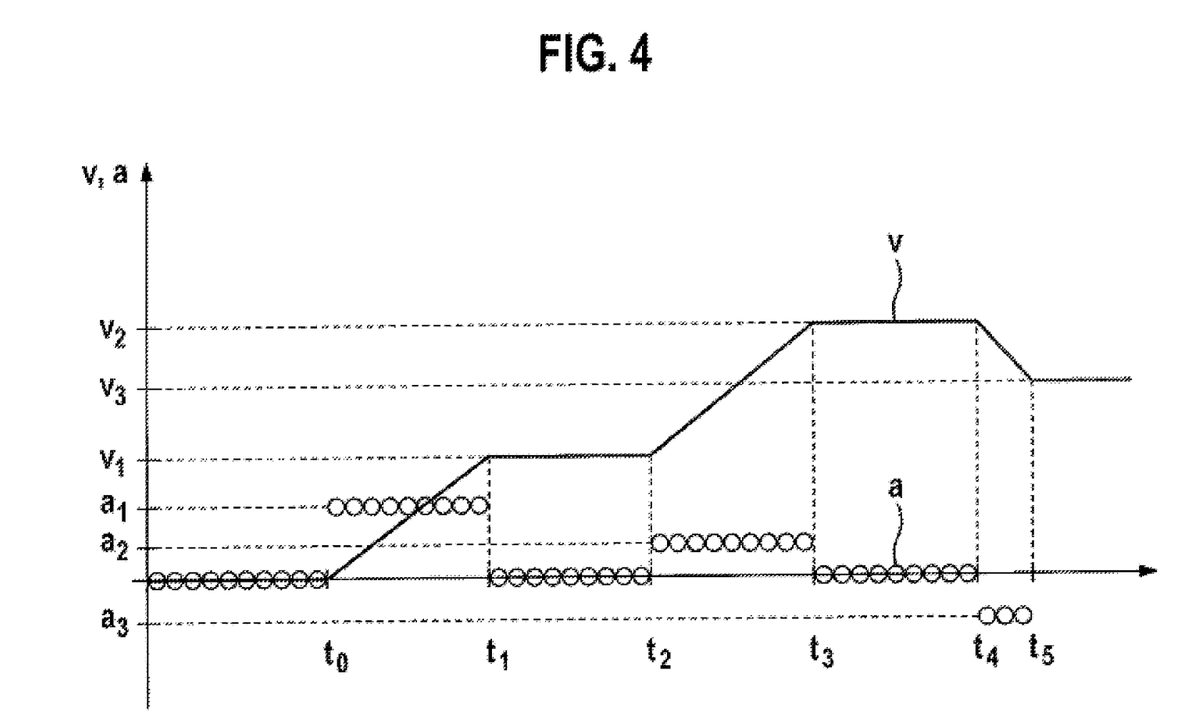
FIG. 4 shows a graph of the acceleration and velocity profiles

FIG. 4 depicts a graph of the time-dependent acceleration a and of the time-based velocity profile v of the electric bicycle 100 in line with the acceleration behavior. At the time to, the push assistance is activated by the cyclist. The control method identifies the activation 310 and, subsequently, the torque M is generated by the electric motor 110, as a result of which the electric bicycle 100 is accelerated in the longitudinal direction with a constant acceleration $a_1$. The time profile of the acceleration a of the electric bicycle 100 during step 320 as a result of the torque M may be configured differently. In this initial phase of the control method for push assistance, preferably no regulation 380 of the torque M on the basis of the captured acceleration a of the electric bicycle 100 in the direction of the longitudinal axis 190 is effected. After the first velocity $v_1$ of the electric bicycle 100 is reached at the time $t_1$, for example 3 km/h, there is initially no further acceleration a by the electric bicycle 100 in the longitudinal direction, see FIG. 4. The first velocity $v_1$ remains constant up to the time $t_2$, because there is no acceleration a by the electric bicycle 100 in the longitudinal direction as a result of a manual pushing or braking force or a force impulse from the cyclist. Between a time $t_2$ and a time $t_3$, the cyclist accelerates the electric bicycle 100 positively in a longitudinal direction by means of a manual force. The positive acceleration a of the electric bicycle 100 in the longitudinal direction is captured and regulation 380 of the electric motor 110 in order to increase the torque M is performed, so that the velocity v of the electric bicycle 100 is increased between the time $t_2$ and the time $t_3$. This results in a second velocity $v_2$. Between the time $t_3$ and the time $t_4$, the second velocity $v_2$ remains constant. Between a time $t_4$ and a time $t_5$, the cyclist accelerates the electric bicycle 100 negatively, i.e. counter to the longitudinal direction. The cyclist 200 accordingly slows down the electric bicycle 100 with a manual force. The acceleration a of the electric bicycle 100 counter to the longitudinal direction is captured by the control method in step 330, and regulation 380 of the electric motor 110 is performed, which lowers the torque M of the electric motor 110, so that the velocity of the electric bicycle 100 is reduced between the time $t_4$ and the time $t_5$. Finally, the electric motor 110 is used to produce a third velocity $v_3$ for the push assistance by virtue of the torque M. In this manner, the cyclist can set a preferred velocity for the push assistance by exerting an appropriate manual pushing or braking force on the bicycle.

The cyclist 200 can accordingly use the control method when walking or when pushing to adapt the velocity v of the push assistance of the electric bicycle 100 intuitively and conveniently, for example by virtue of manual force impulses.

In the event of a change in the incline of a ride section or pushing section, an acceleration a by the electric bicycle 100 in the longitudinal direction is effected on account of its weight, said acceleration being captured by the first sensor 130. In a preferred configuration of the disclosure, the velocity v of the push assistance of the electric bicycle 100 that is set or regulated by means of the control method according to the disclosure is not meant to change even in the event of a change in the incline of a ride section or pushing section if the cyclist does not exert an appropriate pushing or braking force on the electric bicycle 100 in the longitudinal direction. In this preferred configuration, a distinction is made for the cause of acceleration between a change of incline on the ride section and a manual pushing or braking force as a result of capture of the velocity v of the electric bicycle by means of the additional velocity sensor 145 or ascertainment of the velocity v, for example on the basis of the captured acceleration a of the electric bicycle in the longitudinal direction. If a reduced velocity v of the electric bicycle 100 despite a constant torque from the electric motor 110, and no acceleration a above the acceleration threshold value $SW_a$ counter to the longitudinal direction of the electric bicycle, is captured, then there is a high probability of there being a positive incline on the ride section. In this case, the torque of the electric motor 110 is increased on the basis of the velocity until the original velocity before the change of incline is reached again. If, by contrast, an increased velocity v of the electric bicycle 100 despite a constant torque from the electric motor 110, and no acceleration a above the acceleration threshold value $SW_a$ in the longitudinal direction of the electric bicycle, is captured, then there is a high probability of there being a descent or a negative incline on the ride section. In this case, the torque of the electric motor 110 is reduced on the basis of the velocity until the original velocity before the change of incline is reached again.

Alternatively, in a further configuration, the second sensor 140 is used in a step 370 to capture the sensor variable that represents the pitching of the electric bicycle 100 about the transverse axis thereof. The regulation 380 of the electric motor 110 to adapt the torque M or the velocity v is effected, in this configuration, on the basis of the captured sensor variable of the second sensor 140. As sensor variable, the second sensor 140 captures a rate of rotation about the transverse axis of the electric bicycle 100, for example, i.e. the second sensor 140 is a rotation rate sensor. The capture of the rate of rotation is used to detect a change of incline in the ride section. In this configuration, for a captured rate of rotation, either no regulation 380 is performed or the acceleration threshold value $SW_a$ is adapted on the basis of the captured rate of rotation about the transverse axis, with pitching of the electric bicycle 100 forward prompting the acceleration threshold value $SW_a$ counter to the longitudinal direction to be reduced and/or the acceleration threshold value $SW_a$ in the longitudinal direction to be increased until the original velocity before the change of incline on the ride section is reached again. When the electric bicycle 100 pitches backward, there is, by contrast, an increase in the acceleration threshold value $SW_a$ counter to the longitudinal direction and/or a reduction in the acceleration threshold value $SW_a$ in the longitudinal direction until the original velocity before the change of incline on the ride section is reached again.

What is claimed is:

1. A control method for regulating an electric motor of an electric bicycle when a cyclist is manually pushing the bicycle at a gripping position on the bicycle, the method comprising:
    identifying activation of a push assistance by the cyclist manually activating a switch on the bicycle;
    generating a torque with the electric motor to drive the electric bicycle based on the identified activation, to provide push assistance to the cyclist, wherein the torque is adapted to accelerate the bicycle in a direction of a longitudinal axis at a constant acceleration until the bicycle is moving at a predetermined first velocity;
    after the bicycle is moving at said first velocity, capturing an acceleration of the electric bicycle in the direction of the longitudinal axis using a first sensor, wherein the first sensor is one of an acceleration sensor and a force sensor mounted on the handlebar, and the captured acceleration is the result of a manual pushing force or a braking force applied by the cyclist to achieve a desired velocity of the bicycle;
    comparing the captured acceleration with an acceleration threshold value; and
    in response to the captured acceleration exceeding the acceleration threshold value, regulating the electric motor on the basis of a change in the captured acceleration for push assistance of the bicycle at the desired velocity independent of the gripping position of the cyclist on the bicycle.

2. The control method according to claim 1, further comprising:
    ascertaining a velocity of the electric bicycle;
    comparing the ascertained velocity with a velocity threshold value; and
    in response to the ascertained velocity exceeding the velocity threshold value, effecting the regulating of the electric motor.

3. The control method according to claim 1, further comprising:
    capturing a sensor variable using a second sensor, the sensor variable representing a pitch rotational angle of the electric bicycle about a transverse axis of the electric bicycle; and
    effecting the regulating of the electric motor based on the captured sensor variable.

4. The control method of claim 1, wherein the step of identifying the activation of the push assistance by the cyclist includes receiving a signal from a user-operated switch or a microphone, configured to receive audible commands, mounted on the bicycle.

5. A controller for regulating an electric motor of an electric bicycle when a cyclist is manually pushing the bicycle, the controller comprising:
    a computation unit configured to:
        identify activation of a push assistance by the cyclist manually activating a switch on the bicycle;
        generate a control signal provided to the electric motor configured to generate torque with the electric motor to drive the electric bicycle based on the identified activation to provide push assistance to the cyclist, wherein the torque is adapted to accelerate the bicycle in a direction of a longitudinal axis at a constant acceleration until the bicycle is moving at a first velocity;
        after the bicycle is moving at said first velocity, capture an acceleration of the electric bicycle in the longitudinal direction, wherein the captured acceleration is the result of a manual pushing force or a braking force applied by the cyclist to achieve a desired velocity of the bicycle;
        compare the captured acceleration with an acceleration threshold value; and
        in response to the captured acceleration exceeding the acceleration threshold value, adapt the control signal on the basis of a change in the captured acceleration for push assistance of the bicycle at the desired velocity.

6. The controller according to claim 5, the computation unit being further configured to:
    ascertain a current velocity of the electric bicycle; and
    adapt the control signal in response to the ascertained velocity exceeding a velocity threshold value.

7. The controller according to claim 5, the computation unit being further configured to:
  capture a sensor variable that represents a pitch rotational angle of the electric bicycle about a transverse axis of the electric bicycle; and
  adapt the control signal based on the captured sensor variable.

8. The controller of claim 5, further comprising a user-operated switch or a microphone, configured to receive audible commands, mounted on the bicycle and operable to generate a signal for identifying activation of the push assistance by the cyclist.

9. An electric bicycle comprising:
  an electric motor;
  a first sensor configured to capture an acceleration of the electric bicycle in a longitudinal direction; and
  a controller having a computation unit configured to:
    identify activation of a push assistance by a cyclist manually activating a switch on the bicycle;
    generate a control signal provided to the electric motor configured to generate torque with the electric motor to drive the electric bicycle based on the identified activation to provide push assistance to the cyclist, wherein the torque is adapted to accelerate the bicycle in a direction of a longitudinal axis at a constant acceleration until the bicycle is moving at a first velocity;
    after the bicycle is moving at said first velocity, capture, using the first sensor, the acceleration of the electric bicycle in the longitudinal direction, wherein the captured acceleration is the result of a manual pushing force or a braking force applied by the cyclist to achieve a desired velocity of the bicycle;
    compare the captured acceleration with an acceleration threshold value; and
    in response to the captured acceleration exceeding the acceleration threshold value, adapt the control signal on the basis of a change in the captured acceleration for push assistance of the bicycle at the desired velocity.

10. The electric bicycle according to claim 9, further comprising:
  a second sensor configured to capture a sensor variable that represents a pitch rotational angle of the electric bicycle.

11. The electric bicycle according to claim 10, wherein the second sensor is at least one of:
  an acceleration sensor configured to capture an acceleration of the electric bicycle in a direction of a vertical axis; and
  a rotation rate sensor configured to capture a rate of rotation about a transverse axis of the electric bicycle.

12. The electric bicycle of claim 9, further comprising a user-operated switch or a microphone, configured to receive audible commands, mounted on the bicycle and operable to generate a signal for identifying activation of the push assistance by the cyclist.

* * * * *